3,207,695
CHLORATE CANDLE FOR OXYGEN PRODUCTION

Paul R. Gustafson, Oxon Hill, Md., assignor to the United States of America as represented by the Secretary of the Navy
No Drawing. Filed June 11, 1962, Ser. No. 201,738
6 Claims. (Cl. 252—186)
(Granted under Title 35, U.S. Code (1952), sec. 266)

The invention described herein may be manufactured and used by or for the Government of the United States of America for governmental purposes without the payment of any royalties thereon or therefor.

This invention relates generally to improvements in chlorate candles for producing oxygen and more particularly to a new and improved candle composition whereby the rate of oxygen released during burning is considerably stabilized.

Chlorate candles which produce oxygen by decomposing sodium or potassium chlorate have been introduced in recent years for use in connection with such closed atmospheric systems as the modern atomic submarine whose submergence is limited only by the oxygen supply that can be carried on board and for space craft that journey far beyond the oxygen frontier. The term "candle" as employed herein has been coined with reference to oxygen-generating chlorate mixtures which are usually molded or pressed into cylindrical forms resembling candles and which are also utilized in the manner of candles by burning them to release their oxygen content.

It has been the general practice in fabricating chlorate candles to provide a mixture containing, in addition to the chlorate compound, a fibrous ingredient, for example, a metal or glass fiber that protects the candle from crumbling and also prevents the molten zone of the candle from flowing away during burning; barium dioxide, $BaO_2$, that acts both as a catalyst and as a scavenger for possible chlorine gas release during burning; and a metal powder, such as iron, as a source of heat for maintaining the reaction. Although large chlorate candles have been fabricated by heating these mixtures near their melting point and pressing them into a solid cake, considerable difficulty has been experienced with chlorate compositions containing metal fibers, in view of the fact that said compositions burned erratically and the rate of oxygen released varied as much as a factor of 10. The burning rate of the candles changed rapidly in a matter of seconds, from low to high and back again, causing wide fluctuations in the oxygen gas released. Since a filter device was associated with the burning candle, the fluctuating gas flow created a filter problem in that a much larger filter was required in order to handle sudden increases of gas flow.

Difficulty has also been encountered in heating a chlorate mix to a temperature near the melting point thereof because slow decomposition occurs near that temperature and results in a composition with numerous gas bubbles. Consequently, chlorate candles were formed with low densities and reduced rupture strength.

The present invention provides a chlorate composition which effectively suppresses bubble formation during the pressing process and which results in a more dense chlorate candle, greater candle strength and increased resistance to thermal cracking. The distribution of the metal fiber is considerably improved during processing, thus providing a candle that burns uniformly and achieves a more uniform release of oxygen. The present composition has also been found to be suitable for use in an extrusion process in which the novel composition provides a softened extrudable material that causes the steel fibers therein to adhere well within the material, thus reducing the tendency of the fibers to agglomerate or to settle out.

Therefore, it is an object of the present invention to provide a new and improved chlorate candle composition which can be fabricated into candles that provide more uniform release of oxygen during combustion.

Another object of the invention is to provide a chlorate candle composition which suppresses bubble formation during the fabrication process and thus provides a more dense candle with improved rupture strength.

A further object of the present invention is to provide an improved candle composition which can be used to form candles by means of an extrusion process.

A still further object of the invention is to provide a chlorate mixture containing an additive that prevents agglomeration of the metal fiber therein during processing.

Other objects and features of the invention will become apparent to those skilled in the art as the disclosure is made in the following detailed description of a preferred embodiment of the invention.

Chlorate candles formed in accordance with the present invention contain in their composition a relatively small concentration of potassium perchlorate, $KClO_4$, which has been found to be effective in producing candles that burn more uniformly and consequently release oxygen at a more uniform rate than was heretofore possible by previous chlorate candles. The presence of potassium perchlorate in chlorate mixtures that contain metal fibers provide improved compositions in that the metal fibers remain widely distributed during candle processing, and the previous condition caused by agglomeration or the balling effect of the fiber is effectively suppressed. The addition of potassium perchlorate to chlorate mixtures in an amount less than 1% by weight of the mixtures will produce a superior candle in which the tendency of the fibers to cluster or form fiber masses during processing is now substantially minimized.

The chlorate candle mixtures of the present invention are formed into candles by methods which preferably do not employ water as the binding agent during processing, but more advantageously, said methods currently prescribe a dry mix of ingredients, which are melt-cast, hot-pressed or extruded to produce candles substantially free of gaseous impurities. Candles which utilize the present chlorate mixtures in accordance with the invention are preferably fabricated by heating the dry ingredients nearly to the melting point and then pressing the softened mass into a mold at high temperatures to form the desired configuration, or alternately, by extruding the softened mass through a die to compact and shape the mass into a rigid candle configuration. These methods achieve a dense candle composition without the use of water, said composition being more suitable for oxygen generation, since it is now known that even a trace of water in a chlorate candle will contaminate the oxygen with liberation of chlorine gas. It is believed that the presence of a relatively small amount of $KClO_4$ in a dry chlorate mixture which is heated nearly to the melting temperature will result in the formation of a small, transient amount of eutectic, 10% $KClO_4$–90% $NaClO_3$, which has a lower melting point than the chlorate mixture. The metal fibers adhere to the soft, sticky eutectic composition and do not agglomerate or settle out during the processing.

The potassium perchlorate is added to the mixture in an amount less than 1% by weight of said mixture, but the more effective amount of said additive being in the range of about 0.1 to 0.5% by weight. Amounts of more than 1% usually form a sticky mass that becomes unworkable for forming and shaping. $KClO_4$ is endothermic and larger concentrations of this substance will slow down the burning rate of the candle. Chlorate candles in accordance with the present invention may contain ferrous metal fibers in the range of about 3–6 percent by weight and barium dioxide in the range of about 3–6 percent by weight, the bulk of the composition being sodium chlorate between about 85–92 percent by weight. Preferred candle compositions contain approximately 4% iron fiber, 4% $BaO_2$ and 0.5% $KClO_4$, the balance being $NaClO_3$. In some instances, it has been found beneficial to incorporate iron powder into the mixture in amounts of about 2–6% by weight as a partial substitute for barium dioxide and also as a means of furnishing additional heat to sustain the burning reaction.

The improved chlorate composition of the present invention possesses many desirable characteristics. As previously mentioned, the composition has a more widely distributed metal fiber which aids considerably in maintaining a uniform burning rate and consequently a more uniform release of oxygen. In addition, chlorate mixtures which are heated to softening temperatures, just below the melting point (255° C.), form gas pockets due to the hot fiber masses that catalytically decompose the chlorate. Candles that contain air bubbles have a lower density and relatively lower rupture strength. Candles whose composition show numerous air bubbles have densities of about 1.70 g./cc. The addition of 0.5% $KClO_4$ to a chlorate mixture produces candles wherein bubble formation is completely absent. Hot-pressed candles containing about 0.5% $KClO_4$ have an appreciably higher density, in the neighborhood of about 2.3 g./cc. and even as high as 2.6 g./cc.; dense chlorate compositions provide shock-resistant candles, higher oxygen content and display increased resistance to thermal cracking during their combustion.

Chlorate candles produced by a continuous flow process, such as an extrusion process previously mentioned, are materially benefited if a small amount of $KClO_4$, not exceeding 0.5%, is introduced into the dry mix comprising a chlorate, a steel fiber and barium dioxide. The mix is heated to a softening point of from 235° to 245° C. and worked sufficiently into a semi-molten mass; the heated mass is forced through a die and extruded as a continuous cylindrical solid which is then cut into desired candle lengths. The steel fibers adhere to the semi-molten mass and therefore do not agglomerate or settle out during the mixing and forming steps.

Hot-pressed candles are formed by heating a dry mixture to the softening point, as in the previous process, and then pressing the softened mixture into a mold. A preferred candle mixture suitable for this purpose consists essentially of about 91.5% $NaClO_3$, 4% iron fibers, 4% $BaO_2$ and 0.5% $KClO_4$ by weight. The iron fibers preferably have a fiber length of approximately 1 mm. By way of example, a mold 19 cm. in height and having an inner diameter of about 16 cm. was filled with the chlorate mixture and heated to a temperature of about 230° C. The hot mixture was then pressed at ram pressures of up to 10,000 p.s.i. for one minute at temperatures ranging from about 220° to 230° C. The height of the pressed candle was approximately 4.9 cm. and had a volume of about 1000 cc.

Candles which have been produced and found useful for augmenting the oxygen supply in a closed atmospheric system have a height of about 12 inches and a diameter nearly 6.3 inches. Candles fabricated in these dimensions weigh between 25–29.6 lbs. and have densities ranging from about 2.2 g./cc. to 2.6 g./cc. A red-phosphorus igniter composition is cast on one end of the candle and an ignition system of a cap and primer may be included for rapid ignition of the candle. Candles are ignited and burned in a cylindrical steel container to which a fiberglass filter is mounted on the outlet for NaCl smoke removal. The weight percent of oxygen evolved from candles fabricated in accordance with the present invention is approximately 40% and burn for about 50 minutes. The chlorine impurity in the evolved oxygen was evaluated by Drager tubes, and the average value was found to be 0.2 p.p.m. The filter assembly gained an average of about 6 grams which provides a measure of the salt smoke produced during combustion.

The peak gas evolution rate for a prior art candle composition reached about 4.5 cu. ft./min., while the integrated average of the entire candle was 2.5 cu. ft./min. A candle composition containing ½% $KClO_4$ provides a maximum rate of about 3.5 cu. ft./min. and an integrated average of 2.0 cu. ft./min.

Thus, it is readily apparent from the above description that the novel chlorate candles made in accordance with the present invention provide a more uniform release of oxygen during burning, greater candle strength, increased resistance to the normal cracking and uniform chlorate composition. The methods employed in fabricating the candles eliminate gaseous impurities from the evolved oxygen and provide a more dense candle.

Obviously many modifications and variations of the present invention are possible in the light of the above teachings. It is therefore to be understood that within the scope of the appended claims, the invention may be practised otherwise than as specifically described.

What is claimed is:

1. A chlorate candle composition for producing oxygen consisting essentially of a powder mixture of, by weight, from about 85 to about 92% sodium chlorate, from about 3 to about 6% ferrous metal fibers, from about 3 to about 6% barium dioxide, from about 0 to about 6% iron powder and from about 0.1 to about 1% potassium perchlorate.

2. A chlorate candle composition for producing oxygen consisting essentially of a powder mixture of, by weight, from about 85 to about 92% sodium chlorate, from about 3 to 6% iron fibers, from about 3 to about 6% barium dioxide and from about 0.1 to about 0.5% potassium perchlorate.

3. A chlorate candle composition for producing oxygen consisting essentially of a powder mixture of, by weight, about 91.5% $NaClO_3$, about 4% iron fibers, about 4% $BaO_2$ and about 0.5% $KClO_4$.

4. A process of forming a chlorate candle which comprises subjecting a dry powder mixture of, by weight, from about 85 to 92% sodium chlorate, from about 3 to 6% ferrous metal fibers, from about 3 to 6% barium dioxide, from about 0 to 6% iron powder and from about 0.1 to 1% potassium perchlorate to heating at a temperature in the range of from about 230 to 245° C. to form a softened mass of the powder mixture, and then subjecting the resulting hot softened mass to molding under pressure to compact and shape the candle.

5. A process of forming a chlorate candle as defined in claim 4, wherein the amount of potassium perchlorate in the dry powder mixture is from about 0.1 to 0.5% by weight.

6. A process of forming a chlorate candle which comprises subjecting a dry powder mixture of, by weight, about 91.5% sodium chlorate, about 4% iron fibers, about 4% barium dioxide and about 0.5% potassium perchlorate to heating at about 230° C., to form a softened mass of the powdered mixture, and then subjecting the resulting hot softened mass to molding under pressure to compact and shape the candle.

References Cited by the Examiner

UNITED STATES PATENTS

| | | | |
|---|---|---|---|
| 2,121,347 | 6/38 | Hausmann | 23—281 |
| 2,143,367 | 1/39 | Balz et al. | 252—186 |
| 2,469,414 | 5/49 | Schecter | 252—187 |
| 2,558,756 | 7/51 | Jackson et al. | 23—281 |
| 3,089,855 | 5/63 | Bovard | 252—186 |

JULIUS GREENWALD, *Primary Examiner.*

ALBERT T. MEYERS, *Examiner.*